US009166395B2

(12) United States Patent
Armstrong et al.

(10) Patent No.: US 9,166,395 B2
(45) Date of Patent: Oct. 20, 2015

(54) DIMMER CONTROL WITH SOFT START OVER-CURRENT PROTECTION

(71) Applicant: Fairchild Semiconductor Corporation, San Jose, CA (US)

(72) Inventors: Bruce Armstrong, San Mateo, CA (US); Alexander H. Craig, Viera, FL (US)

(73) Assignee: Fairchild Semiconductor Corporation, San Jose, CA (US)

( * ) Notice: Subject to any disclaimer, the term of this patent is extended or adjusted under 35 U.S.C. 154(b) by 375 days.

(21) Appl. No.: 13/738,071

(22) Filed: Jan. 10, 2013

(65) Prior Publication Data

US 2013/0176755 A1 Jul. 11, 2013

Related U.S. Application Data (60) Provisional application No. 61/585,061, filed on Jan. 10, 2012.

(51) Int. Cl.
*H05B 37/02* (2006.01)
*H02H 3/20* (2006.01)
*H02H 3/08* (2006.01)

(52) U.S. Cl.
CPC .. *H02H 3/20* (2013.01); *H02H 3/08* (2013.01)

(58) Field of Classification Search
CPC ........... H02H 3/08; H02H 3/20; H05B 37/02; H05B 33/08; H05B 33/0833; H05B 33/0875; H05B 33/0884
USPC ............. 315/209 R, 224, 225, 291, 307, 308, 315/360, 362, 44, 45, 52, 54, 57, 76–90, 98
See application file for complete search history.

(56) References Cited

U.S. PATENT DOCUMENTS

| 7,164,238 | B2 | 1/2007 | Kazanov et al. |
| RE42,425 | E | 6/2011 | DeJonge et al. |
| 2007/0188112 | A1 | 8/2007 | Kang et al. |
| 2012/0092909 | A1* | 4/2012 | Usami ............................ 363/80 |

FOREIGN PATENT DOCUMENTS

| CN | 1398503 A | 2/2003 |
| CN | 2884775 Y | 3/2007 |
| CN | 101835314 A | 9/2010 |

OTHER PUBLICATIONS

"Chinese Application Serial No. 201310009503.0, Office Action mailed Feb. 2, 2015", 3 pgs.
"Chinese Application Serial No. 201310009503.0, Office Action mailed Sep. 3, 2014", 7 pgs.
"Chinese Application Serial No. 201310009503.0, Response filed Mar. 31, 2015 to Office Action mailed Feb. 2, 2015", w/English Translation of Claims, 11 pgs.

* cited by examiner

Primary Examiner — Jimmy Vu
(74) Attorney, Agent, or Firm — Schwegman Lundberg & Woessner, P.A.

(57) ABSTRACT

This document discloses, among other things, apparatus and methods for dimmer control. In an apparatus example, a circuit can include an input configured to receive a control signal, a controller configured to modulate a pulse width of a pulse train using the control signal when the controller is enabled, an output configured to provide the pulse train to a driver, and first and second current limit detectors configured to receive load current information of the driver and to terminate an active pulse of the controller when a value of the load current information exceeds a threshold.

20 Claims, 4 Drawing Sheets

DIMMER CONTROL WITH SOFT START OVER-CURRENT PROTECTION

CLAIM OF PRIORITY AND RELATED APPLICATIONS

This patent application claims the benefit of priority, under 35 U.S.C. Section 119(e), to Armstrong et al., U.S. Provisional Patent Application Ser. No. 61/585,061, entitled "DIMMER CONTROL WITH SOFT START OVER-CURRENT PROTECTION," filed on Jan. 10, 2012, which is hereby incorporated by reference herein in its entirety.

BACKGROUND

Incandescent tungsten filaments can have a very high positive resistivity temperature coefficient. At startup, a high current (~10×) can flow until the temperature reaches steady state (~3000° K). Dimmer control and power circuits to control such filaments can require the use of large, expensive transistors to accommodate the start-up current.

OVERVIEW

This document refers to, among other things, apparatus and methods for a dimmer control. In an apparatus example, a circuit can include an input configured to receive a control signal, a controller configured to modulate a pulse width of a pulse train using the control signal when the controller is enabled, an output configured to provide the pulse train to a driver, and first and second current limit detectors configured to receive load current information of the driver and to terminate an active pulse of the controller when a value of the load current information exceeds a threshold.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Present dimmers typically use TRIAC (Triode for Alternating Current) circuits to generate an alternating current (AC) symmetric current function. TRIAC dimmers are leading edge dimmers that turn off the AC current when the voltage crosses zero volts (e.g., zero-crossing, zero-crossing event) and turn on the AC current at a programmable phase angle during the half cycle. A TRIAC can be analogous to two silicon controlled rectifier (SCR) transistors that allow for AC operations in both the positive and negative half cycles. A TRIAC can have a fast turn-on that can present a high AC voltage, and, correspondingly, can generate a fast, high load current. In general, though, leading-edge dimmers do not allow for straightforward current limiting or slew rate control. Further, the "holding" current requirements of TRIAC dimmers, which are typically non-symmetric, can produce flicker in light-emitting diode (LED) and compact florescent lighting (CFL) products.

The present inventors have recognized, among other things, a trailing edge dimmer that can provide current limiting capabilities and reduce or eliminate minimum holding current requirements when used with LED, CFL, or incandescent lighting products. In an example, the dimmer disclosed herein can include one or more current limit detectors configured to detect and limit the peak current such that low tolerance, low cost electronics can be used to reliably power and dim LED, CFL, or incandescent lighting products, or one or more other lighting or electrical products, such as solenoids or valves.

Figure 1A:
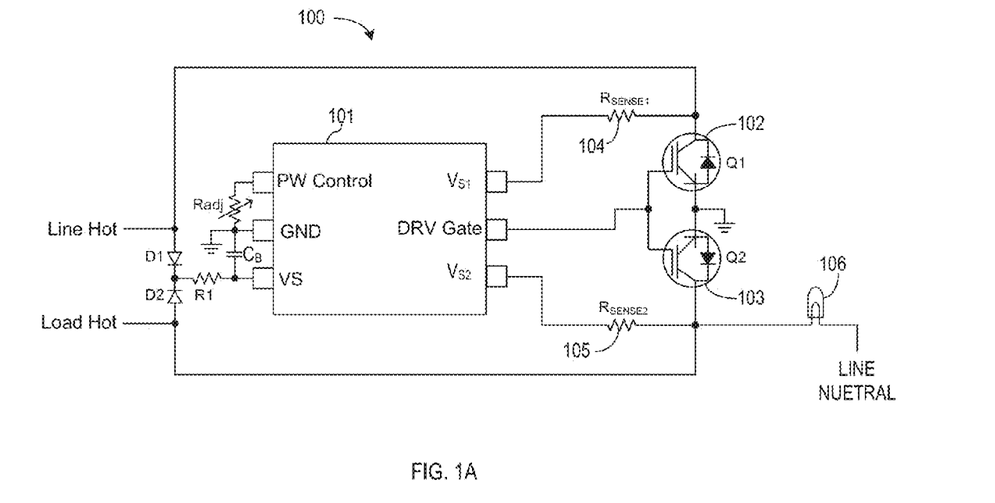
FIGS. 1A and 1B illustrate generally lighting circuits including example dimmer circuits.
Figure 1B:
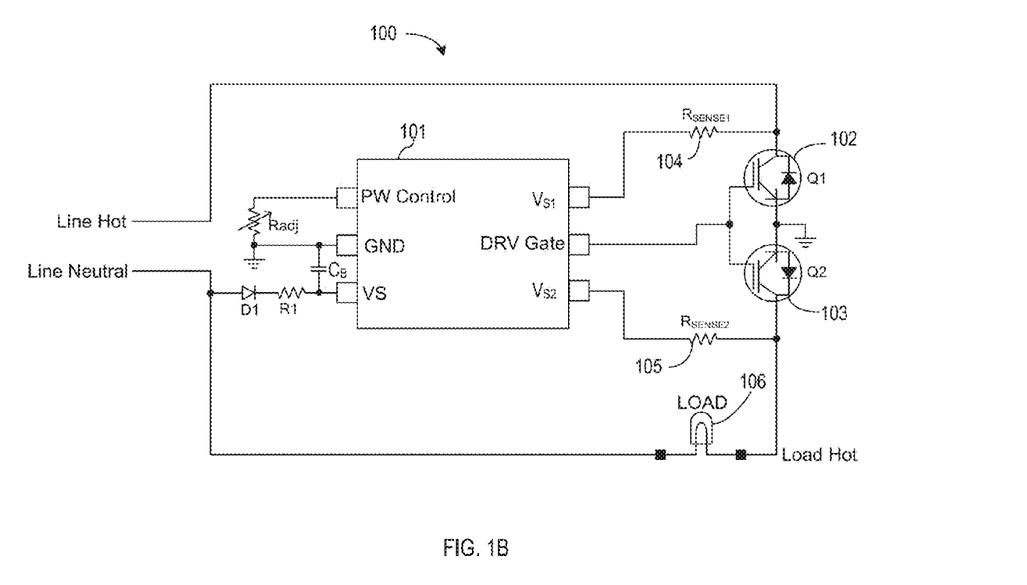

FIGS. 1A and 1B illustrate generally an example lighting circuit 100 including a control circuit, such as a dimmer controller 101. Each lighting circuit 100 can include a dimmer controller 101, a driver, such as first and second power transistors 102, 103 (Q1, Q2), first and second sense resistors 104, 105 ($R_{SENSE1}$, $R_{SENSE2}$), and a light source 106. In certain examples, a single integrated circuit chip can include the dimmer controller 101. In an example, a setpoint resistor ($R_{adj}$) can set a control signal, or a dimmer set point, received by the dimmer controller 101. In certain examples, the setpoint resistor ($R_{adj}$) can be adjustable.

FIG. 1A illustrates generally a 2-wire dimmer application that can be used in situations where an electrical box does not have a neutral AC line available, such as situations where only the AC line hot and the AC load hot wires are available. The dimmer controller 101 can be biased from the AC power when the first and second power transistors 102, 103 are off. When the control voltage is high and the first and second power transistors 102, 103 are on, the dimmer control bias can be supplied by the voltage across a supply capacitor ($C_B$). During the "off time" the supply capacitor ($C_B$) can charge during the positive and negative cycles through first and second diodes D1, D2 and a first resistor R1. Because the dimmer controller 101 is biased from the AC supply when the first and second power transistors 102, 103 are off, the maximum duty cycle of 2-wire dimmer applications is limited, in certain examples, to about 75%.

The first and second sense resistors 104, 105 can provide load current information of the driver, such as first and second power transistors 102, 103 (Q1, Q2), to the dimmer controller 101. The sense resistors 104, 105 can monitor load current by sensing a drain-source resistance ($RDS_{ON}$) voltage drop across the first and second power transistors 102, 103 and generating a sense current ($I_{SENSE}$). The dimmer controller 101 can compare the sense current ($I_{SENSE}$) to a threshold, such as a reference current, and can interrupt one or more pulse widths configured to control the first and second power transistors 102, 103 when the sense current ($I_{SENSE}$) reaches the threshold. In certain examples, the sense current ($I_{SENSE}$) can be representative of an actual load current supplied by the driver. In certain examples, the threshold can be representative of a current limit of the driver. The first and second sense resistors 104, 105 ($R_{SENSE1}$, $R_{SENSE2}$) can also be used to determine the phase of the AC supply voltage and zero-crossing points, or events, using a zero-crossing comparator.

FIG. 1B illustrates generally a 3-wire dimmer application that can be used in situations where an electrical box has a neutral AC line available. In FIG. 1B, the line neutral is coupled to the dimmer controller 101 and a 100% duty cycle is possible. A supply capacitor ($C_B$) is biased and can charge to a peak voltage during the negative half cycle. During the positive half cycle, the supply capacitor ($C_B$) can supply a bias to the dimmer controller 101.

Figure 2:
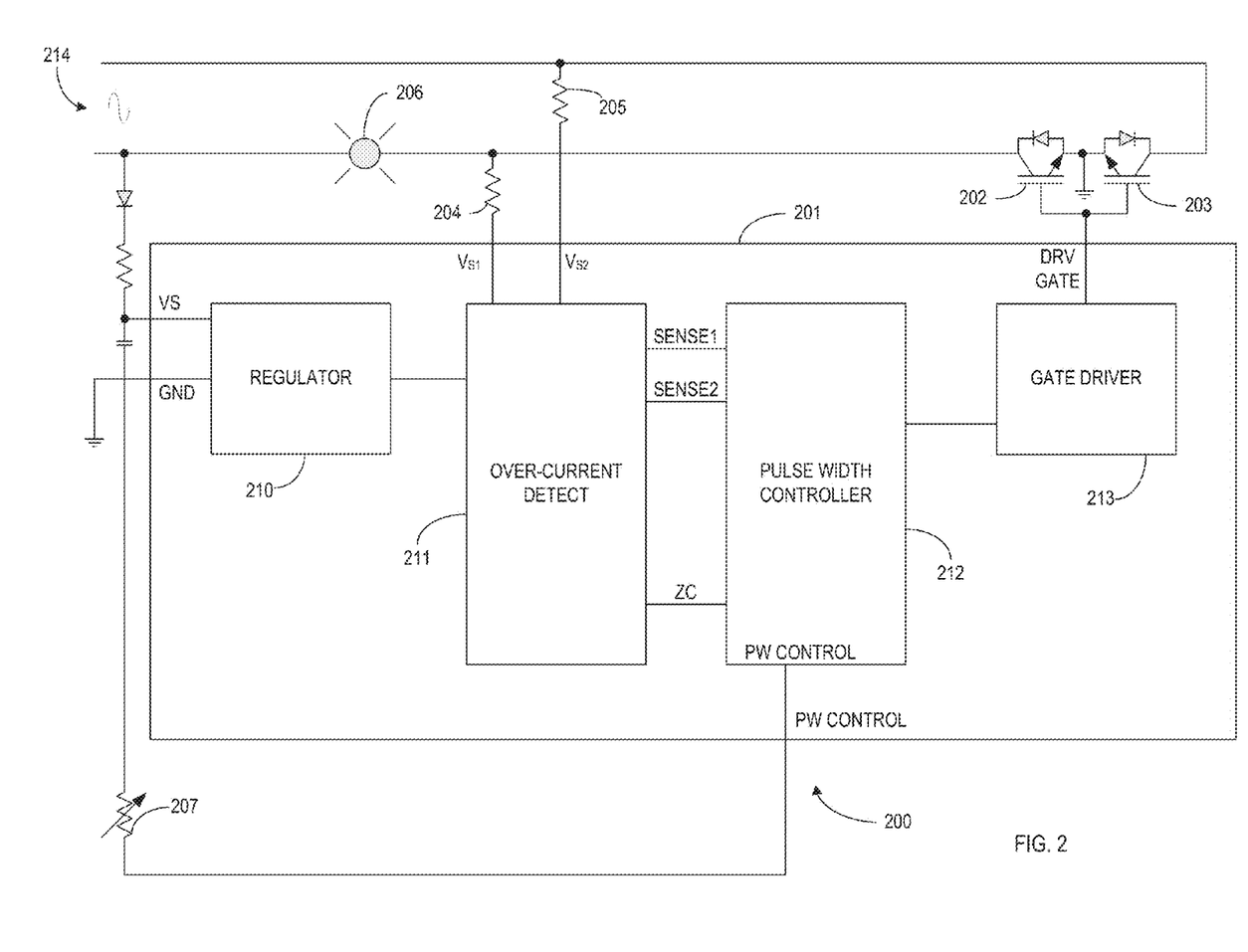
FIG. 2 illustrates generally a lighting circuit including a block diagram of an example dimmer controller.

FIG. 2 illustrates generally a lighting circuit 200 including a block diagram of an example dimmer controller 201. The lighting circuit 200 can include a dimmer controller 201, a light source 206, an adjustable dimmer resistor 207, first and second sense resistors 204, 205, and first and second power transistors 202, 203. The dimmer controller 201 can include a regulator 210, a current limit detector 211, a pulse width controller 212, and a gate drive 213. In certain examples, the dimmer controller 201 can modulate a pulse width of a pulse train according to a setpoint to control the illumination of the light source 206. A driver can include the first and second power transistors 202, 203 to provide power to the light source 206 such that the power transferred to the light source 206 is related to the width of the pulses of the pulse train. In certain examples, the dimmer controller 201 can include an input that can terminate an active pulse of the pulse train without regard to the setpoint. In some examples, the input can prevent the dimmer controller from generating a new active pulse.

The regulator 210 can convert the voltage of an AC supply 214 to one or more desired circuit supply voltages, such as direct current (DC) power voltages.

The current limit detector 211 can monitor load current information of the driver and can provide signals to limit the current of the lighting circuit 200 such that less expensive circuit components can be used with the dimmer controller 201. In certain examples, the pulse width controller 212 can receive dimmer setpoint information (PW_CONTROL) from a resistor coupled to an input of the dimmer controller. In some examples, the pulse width controller 212 can control the first and second power transistors 202, 203 to maintain the lighting at the dimmer setpoint. In certain examples, the current limit detector 211 can include a comparator to provide a disable signal to the pulse width controller 212 when the driver is at or approaching a current limit, and to provide an enable signal when the driver is not operating near or above a current limit. The current limit detector 211 can provide a disable signal to interrupt the control of the first or second power transistors 202, 203 by the pulse width controller 212 to limit the current of the lighting circuit 200. In some examples, the current limit detector 211 can interrupt an active pulse of the pulse width controller 212 using the disable signal. In certain examples, the lighting circuit 200 can include a gate drive 213 to drive a driver including the first or second power transistors 202, 203 and, in some examples, buffer the dimmer controller 201 from the first and second power transistors 202, 203.

Figure 3:
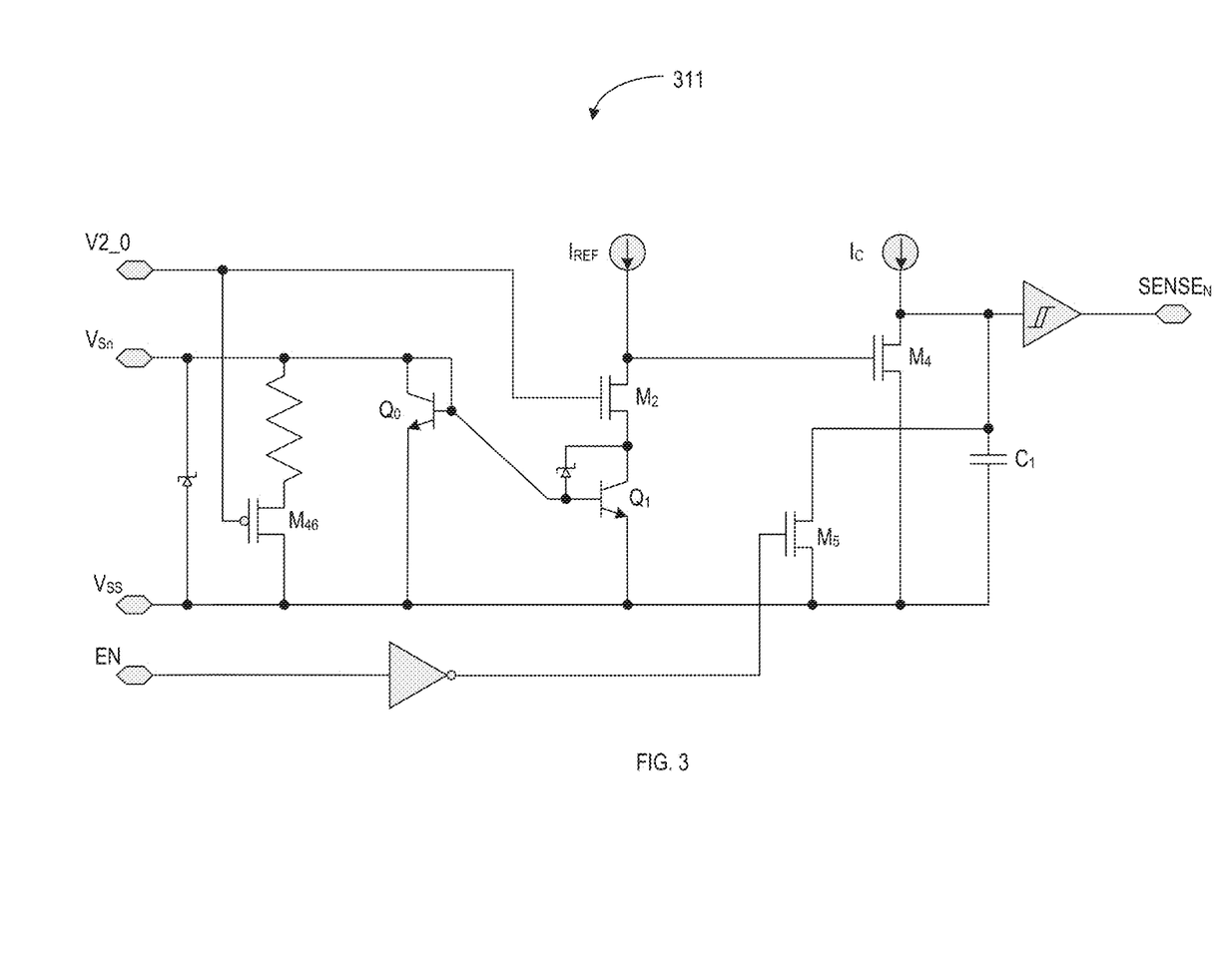
FIG. 3 illustrates generally an example over current detect circuit for a dimmer switch circuit.

FIG. 3 illustrates generally an example current limit detector 311 for a dimmer circuit. The current limit detector 311 can include a first transistor ($Q_0$) configured to clamp a signal at a sense terminal ($V_{Sn}$) to a reference voltage of about 700 millivolts (mV) with respect to Vss. In certain examples, the first transistor ($Q_0$) can be coupled to a second transistor ($Q_1$) to mirror a representation of the current flowing at the sense terminal ($V_{Sn}$). The current flowing at the sense terminal ($V_{Sn}$) can provide a representation of the current flowing through the driver transistors (e.g., 202, 203). As such, in some examples, the first and second transistors ($Q_0$, $Q_1$) can form a current mirror with the first transistor ($Q_0$) acting as a sense transistor and the second transistor ($Q_1$) acting as a mirror transistor. In an example, the mirrored current can be summed with a precision reference current ($I_{REF}$). In certain examples, the reference current ($I_{REF}$) can be coupled to a control node of a comparator transistor ($M_4$).

In certain examples, at least a portion of the reference current ($I_{REF}$) can be diverted as mirror current through the second transistor ($Q_1$). When the mirror current of the second transistor ($Q_1$) is approximately equal to, or exceeds, the reference current ($I_{REF}$), the comparator transistor ($M_4$) can transition from a low impedance state (e.g., an on-state) to a high impedance state (e.g., an off-state). When the comparator transistor ($M_4$) is in a high impedance state, the current ($I_C$) from a second current source can charge a capacitor ($C_1$). When the voltage across the capacitor ($C_1$) reaches a threshold, e.g., 3 volts or one or more other voltage levels, a logic signal ($SENSE_N$) can transition to turn off one or more power transistors, such as one or more external IGBT/MOSFET transistors, thus, providing a current limit mechanism for the load current. In certain examples, the logic signal ($SENSE_N$) can be a discrete disable signal received by the pulse width controller 212 to terminate an active pulse.

In certain examples, the capacitor ($C_1$) can be configured to charge in about 40 microseconds (µsec), creating a 25 KHz low-pass filter to reject high frequency noise spikes. In an example, the current limit detector 311 can include logic to receive an enable signal (EN) to enable or disable the over-current detection capability. In certain examples, a third transistor ($M_5$) can be used to reset the voltage across the capacitor ($C_1$).

In certain examples, the current limit detector 311 can include a zero-crossing detector (not shown) to provide an indication of a zero-crossing event (e.g., when the supply voltage crosses zero volts). In an example, a zero-crossing detector can use the voltage ($V_{Sn}$) at the sense terminal to detect at least one periodic zero-crossing event. In an example, a zero-crossing detector can include an operational amplifier comparator. A first input of the operational amplifier comparator can be coupled to ground, and a second input of the operational amplifier comparator can be coupled to supply voltage, or a representation of the supply voltage, such as the sense voltage, for example. As the supply voltage varies past the ground voltage, either positive or negative, the output of the operational amplifier comparator can change. Each transition of the operational amplifier comparator output can indicate a zero-crossing event. It is understood that an op-amp comparator is one example of a zero-crossing detector, that other circuits are possible for detecting and indicating a zero-crossing event, and that such other zero-crossing detector circuits are within the scope of the present subject matter.

Figure 4:
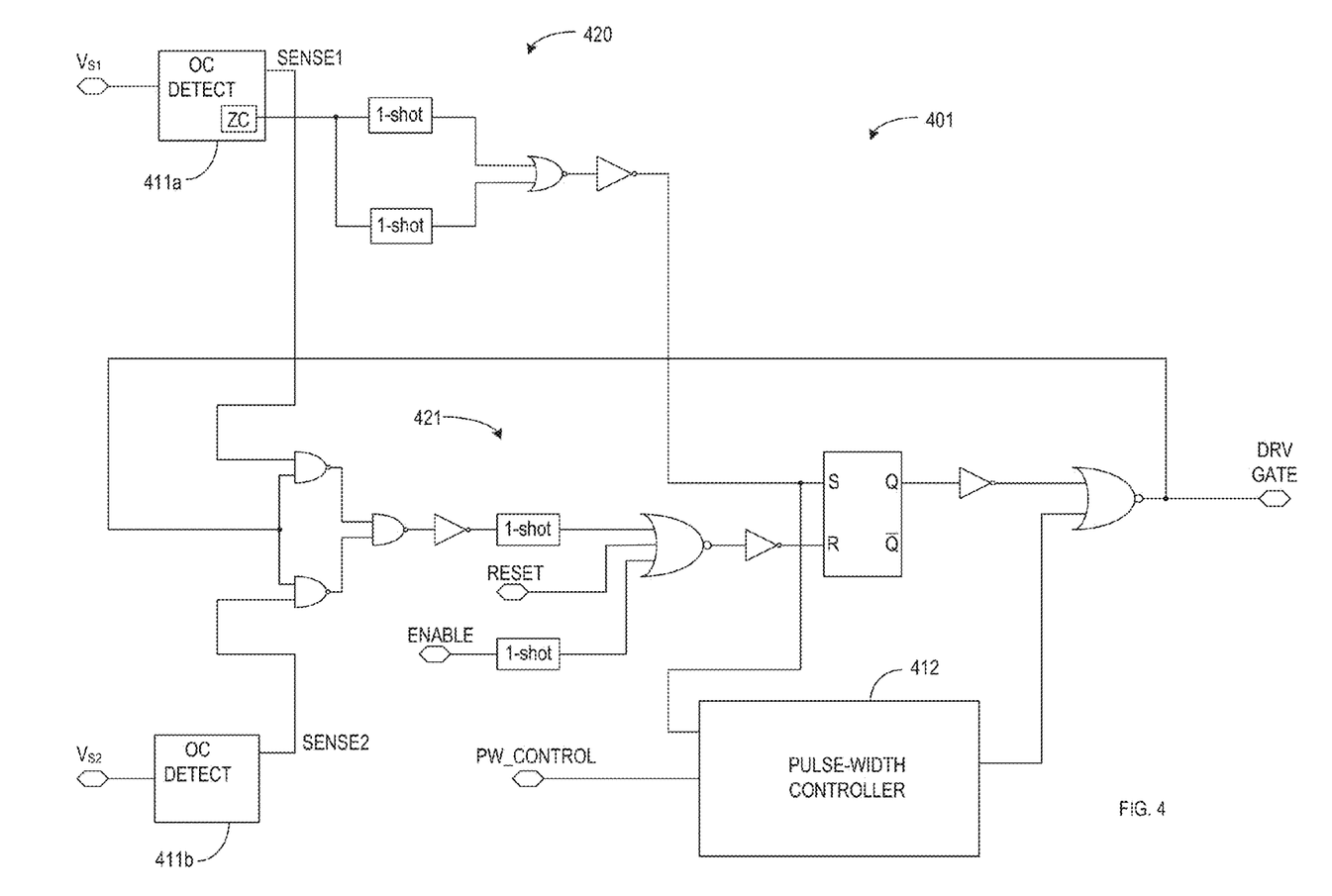
FIG. 4 illustrates generally an example dimmer control circuit.

FIG. 4 illustrates generally an example dimmer control circuit 401 including first and second over-current detect circuits, such as current limit detectors 411a, 411b, a zero-crossing detector 420, a pulse width controller 412, and a current limit control logic 421. In certain examples, the dimmer control circuit 401 can include a regulator to provide one or more DC voltages provide power to one or more of the components of the dimmer control circuit 401. The first and second current limit detectors 411a, 411b can limit an on-time of one or more power switches (not shown) via the current limit control logic 421. In certain examples, the first current limit detector 411a can monitor and limit current during a positive voltage phase of the AC supply and the second current limit detector 411b can monitor and limit current during a negative voltage phase of the AC supply, or vice versa. If no over-current conditions are detected, the pulse width controller 412 can control the power switches using a setpoint established by a pulse width control input (PW_CONTROL). In certain examples, the pulse width control input can be coupled to an adjustable component, such as an adjustable resistor, to allow various dimmer settings. When an over-current condition is detected, the current limit control logic 421 can override the control of the dimmer controller output (DRV GATE) by the pulse width controller 412 to limit the current of the dimmer control circuit 401.

Additional Notes

In Example 1, a circuit can include an input configured to receive a control signal, a controller configured to modulate a pulse width of a pulse train using the control signal when the controller is enabled, an output configured to provide the pulse train to a driver, and first and second current limit detectors configured to receive load current information of the driver and to terminate an active pulse of the controller when a value of the load current information exceeds a threshold.

In Example 2, the first current limit detector of Example 1 optionally includes a zero-crossing detector configured to detect a zero-crossing event of an alternating current (AC) supply and to provide a discrete signal to the controller indicative of the zero-crossing event of the AC supply.

In Example 3, the controller of any one or more of Examples 1-2 optionally is configured to receive the discrete signal indicative of the zero-crossing event and to generate a pulse at the zero-crossing event using the discrete signal indicative of the zero-crossing event of the AC supply.

In Example 4, the circuit of any one or more of Examples 1-3 optionally includes a regulator configured to receive power from the AC supply and to provide direct current (DC) power to the controller.

In Example 5, the threshold of any one or more of Examples 1-4 optionally includes a reference current.

In Example 6, the load current information of any one or more of examples 1-5 optionally includes first and second currents representative of a load current of the driver, wherein the first current is representative of load current during a positive voltage phase of the AC supply and the second current is representative of load current during a negative voltage phase of the AC supply.

In Example 7, each of the first and second current limit detectors of any one or more of Examples 1-6 optionally includes a comparator, wherein each of the comparators includes a transistor configured compare the reference current to a representative current of one of the first or second currents, to provide an enable signal to the controller when the reference current is above the representative current of one of the first or second currents, and to provide a disable signal to the controller when the reference current is below the representative current.

In Example 8, each of the first and second current limit detectors of any one or more of Examples 1-7 optionally includes a current mirror configured to receive one of the first or second currents at a sense transistor of the current mirror and to provide the representative current at a mirror transistor of the current mirror.

In Example 9, the comparator of the first current limit detector of any one or more of Examples 1-8 optionally is configured to receive load current information during the positive voltage phase of the AC supply, to compare the load current information during the positive voltage phase of the AC supply to the threshold, and to terminate the active pulse of the controller when a value of the load current information during the positive voltage phase of the AC supply exceeds a threshold. The comparator of the second current limit detector of any one or more of Examples 1-8 optionally is configured to receive load current information during the negative voltage phase of the AC supply, to compare the load current information during the negative voltage phase of the AC supply to the threshold, and to terminate the active pulse of the controller when a value of the load current information during the negative voltage phase of the AC supply exceeds a threshold.

In Example 10, the input, the controller, the output, and the first and second current limit detectors of any one or more of Examples 1-9 optionally are included in a single integrated circuit chip.

In Example 11, the single integrated circuit chip of any one or more of Examples 1-10 optionally includes a regulator configured to receive power from the AC supply and to provide direct current (DC) power to the controller.

In Example 12, a method can include receiving a control signal at an input of a control circuit, modulating a pulse width of a pulse train using the control signal when a controller of the control circuit is enabled, providing the pulse train to a driver using an output of the control circuit, receiving load current information from the driver at one of a first or second current limit detectors of the control circuit, receiving a threshold at the one of the first or second current limit detectors, and terminating an active pulse of the controller when a value of the load current information exceeds a value of the threshold.

In Example 13, the receiving load current information of any one or more of Examples 1-12 optionally includes receiving first and second currents representative of the load current respectively at each of the first and second current limit detectors.

In Example 14, the receiving the threshold of any one or more of Examples 1-13 optionally includes receiving a reference current at one of the first or second current limit detectors.

In Example 15, the method of any one or more of Examples 1-14 optionally includes mirroring one of the first and second currents to provide a representative current of the load current using a current mirror.

In Example 16, the method of any one or more of Examples 1-15 optionally includes comparing the representative current to the reference current using a comparator transistor.

In Example 17, the terminating an active pulse of the controller of any one or more of Examples 1-16 optionally includes receiving the reference current at a control node of the comparator transistor and diverting a larger current, approximately equivalent to the representative current, from the control node of the comparator transistor when a current limit of the driver is exceeded, wherein the reference current is representative of the current limit of the driver.

In Example 18, the method of any one or more of examples 1-17 optionally includes detecting a zero-crossing event of an alternating current (AC) supply coupled to the control circuit using one of the first or second current limit detectors and providing a discrete signal to the controller indicative of the zero-crossing event of the AC supply.

In Example 19, the method of any one or more of Examples 1-18 optionally includes receiving the discrete signal indicative of the zero-crossing event at the controller and initiating the active pulse using the discrete signal indicative of the zero-crossing event of the AC supply.

In Example 20, a system can include an input configured to receive a control signal, a controller configured to modulate a pulse width of a pulse train using the control signal when the controller is enabled, a regulator configured to receive power from an alternating current (AC) supply and to provide direct current (DC) power to the controller, an output configured to provide the pulse train to a driver, first and second current limit detectors configured to receive load current information of the driver and to terminate an active pulse of the controller when a value of the load current information exceeds a threshold, wherein the first current limit detector includes a zero-crossing detector configured to detect a zero-crossing event of the AC supply and to provide a discrete signal to the controller indicative of the zero-crossing event of the AC supply; wherein the controller is configured to receive the discrete signal indicative of the zero-crossing event and to generate a pulse at the zero-crossing event using the discrete signal indicative of the zero-crossing event of the AC supply, wherein the threshold includes a reference current, wherein the load current information includes first and second currents representative of a load current of the driver, wherein the first current is representative of load current during a positive voltage phase of the AC supply and the second current is representative of load current during a negative voltage phase of the AC supply, wherein each of the first and second current limit detectors includes a comparator, wherein each of the comparators comparator includes a transistor configured compare the reference current to a representative current of one of the first or second currents, to provide an enable signal to the controller when the reference current is above the representative current of one of the first or second currents, and to provide a disable signal to the controller when the reference current is below the representative current, wherein each of the first and second current limit detectors includes a current mirror configured to receive one of the first or second currents at a sense transistor of the current mirror and to provide the representative current at a mirror transistor of the current mirror, wherein the comparator of the first current limit detector is configured to receive load current information during the positive voltage phase of the AC supply, to compare the load current information during the positive voltage phase of the AC supply to the threshold, and to terminate the active pulse of the controller when a value of the load current information during the positive voltage phase of the AC supply exceeds a threshold; wherein the comparator of the first current limit detector is configured to receive load current information during the negative voltage phase of the AC supply, to compare the load current information during the negative voltage phase of the AC supply to the threshold, and to terminate the active pulse of the controller when a value of the load current information during the negative voltage phase of the AC supply exceeds a threshold, and wherein the input, the controller, the output, and the first and second current limit detectors are included in a single integrated circuit chip.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In Example 21, a system or apparatus can include, or can optionally be combined with any portion or combination of any portions of any one or more of Examples 1-20 to include, means for performing any one or more of the functions of Examples 1-20, or a machine-readable medium including instructions that, when performed by a machine, cause the machine to perform any one or more of the functions of Examples 1-20.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A circuit comprising:
   an input configured to receive a control signal;
   a controller configured to modulate a pulse width of a pulse train using the control signal when the controller is enabled;
   an output configured to provide the pulse train to a driver; and
   first and second current limit detectors configured to receive load current information of the driver and to terminate an active pulse of the controller when a value of the load current information exceeds a threshold.

2. The circuit of claim 1, wherein the first current limit detector includes a zero-crossing detector configured to detect a zero-crossing event of an alternating current (AC) supply and to provide a discrete signal to the controller indicative of the zero-crossing event of the AC supply.

3. The circuit of claim 2, wherein the controller is configured to receive the discrete signal indicative of the zero-crossing event and to generate a pulse at the zero-crossing event using the discrete signal indicative of the zero-crossing event of the AC supply.

4. The circuit of claim 2, including a regulator configured to receive power from the AC supply and to provide direct current (DC) power to the controller.

5. The circuit of claim 1, wherein the threshold includes a reference current.

6. The circuit of claim 5, wherein the load current information includes first and second currents representative of a load current of the driver, wherein the first current is representative of load current during a positive voltage phase of the AC supply and the second current is representative of load current during a negative voltage phase of the AC supply.

7. The circuit of claim 6, wherein each of the first and second current limit detectors includes a comparator, wherein each of the comparators includes a transistor configured to compare the reference current to a representative current of one of the first or second currents, to provide an enable signal to the controller when the reference current is above the representative current of one of the first or second currents, and to provide a disable signal to the controller when the reference current is below the representative current.

8. The circuit of claim 7, wherein each of the first and second current limit detectors includes a current mirror configured to receive one of the first or second currents at a sense transistor of the current mirror and to provide the representative current at a mirror transistor of the current mirror.

9. The circuit of claim 6, wherein the comparator of the first current limit detector is configured to receive load current information during the positive voltage phase of the AC supply, to compare the load current information during the positive voltage phase of the AC supply to the threshold, and to terminate the active pulse of the controller when a value of the load current information during the positive voltage phase of the AC supply exceeds the threshold; and
   wherein the comparator of the second current limit detector is configured to receive load current information during the negative voltage phase of the AC supply, to compare the load current information during the negative voltage phase of the AC supply to the threshold, and to terminate the active pulse of the controller when a value of the load current information during the negative voltage phase of the AC supply exceeds the threshold.

10. The circuit of claim 1, wherein the input, the controller, the output, and the first and second current limit detectors are included in a single integrated circuit chip.

11. The circuit of claim 10, wherein the single integrated circuit chip includes a regulator configured to receive power from the AC supply and to provide direct current (DC) power to the controller.

12. A method comprising:
   receiving a control signal at an input of a control circuit;
   modulating a pulse width of a pulse train using the control signal when a controller of the control circuit is enabled;
   providing the pulse train to a driver using an output of the control circuit;
   receiving load current information from the driver at one of a first or second current limit detectors of the control circuit;
   receiving a threshold at the one of the first or second current limit detectors; and
   terminating an active pulse of the controller when a value of the load current information exceeds a value of the threshold.

13. The method of claim 12, wherein receiving load current information includes receiving first and second currents representative of the load current respectively at each of the first and second current limit detectors.

14. The method of claim 13, wherein receiving the threshold includes receiving a reference current at one of the first or second current limit detectors.

15. The method of claim 14, including mirroring one of the first and second currents to provide a representative current of the load current using a current mirror.

16. The method of claim 15, including comparing the representative current to the reference current using a comparator transistor.

17. The method of claim 16, wherein terminating an active pulse of the controller includes receiving the reference current at a control node of the comparator transistor and diverting a larger current, approximately equivalent to the representative current, from the control node of the comparator transistor when a current limit of the driver is exceeded, wherein the reference current is representative of the current limit of the driver.

18. The method of claim 12, including detecting a zero-crossing event of an alternating current (AC) supply coupled to the control circuit using one of the first or second current limit detectors and providing a discrete signal to the controller indicative of the zero-crossing event of the AC supply.

19. The method of claim 12, including receiving the discrete signal indicative of the zero-crossing event at the controller and initiating the active pulse using the discrete signal indicative of the zero-crossing event of the AC supply.

20. A system comprising:
   an input configured to receive a control signal;
   a controller configured to modulate a pulse width of a pulse train using the control signal when the controller is enabled;
   a regulator configured to receive power from an alternating current (AC) supply and to provide direct current (DC) power to the controller;
   an output configured to provide the pulse train to a driver;
   first and second current limit detectors configured to receive load current information of the driver and to terminate an active pulse of the controller when a value of the load current information exceeds a threshold;

wherein the first current limit detector includes a zero-crossing detector configured to detect a zero-crossing event of the AC supply and to provide a discrete signal to the controller indicative of the zero-crossing event of the AC supply;

wherein the controller is configured to receive the discrete signal indicative of the zero-crossing event and to generate a pulse at the zero-crossing event using the discrete signal indicative of the zero-crossing event of the AC supply;

wherein the threshold includes a reference current;

wherein the load current information includes first and second currents representative of a load current of the driver, wherein the first current is representative of load current during a positive voltage phase of the AC supply and the second current is representative of load current during a negative voltage phase of the AC supply;

wherein each of the first and second current limit detectors includes a comparator, wherein each of the comparators includes a transistor configured to compare the reference current to a representative current of one of the first or second currents, to provide an enable signal to the controller when the reference current is above the representative current of one of the first or second currents, and to provide a disable signal to the controller when the reference current is below the representative current;

wherein each of the first and second current limit detectors includes a current mirror configured to receive one of the first or second currents at a sense transistor of the current mirror and to provide the representative current at a mirror transistor of the current mirror;

wherein the comparator of the first current limit detector is configured to receive load current information during the positive voltage phase of the AC supply, to compare the load current information during the positive voltage phase of the AC supply to the threshold, and to terminate the active pulse of the controller when a value of the load current information during the positive voltage phase of the AC supply exceeds the threshold;

wherein the comparator of the second current limit detector is configured to receive load current information during the negative voltage phase of the AC supply, to compare the load current information during the negative voltage phase of the AC supply to the threshold, and to terminate the active pulse of the controller when a value of the load current information during the negative voltage phase of the AC supply exceeds the threshold; and wherein the input, the controller, the output, and the first and second current limit detectors are included in a single integrated circuit chip.

* * * * *